United States Patent
Kawauchi et al.

(10) Patent No.: US 9,329,514 B2
(45) Date of Patent: May 3, 2016

(54) CARRIER CORE PARTICLE FOR ELECTROPHOTOGRAPHIC DEVELOPER, METHOD FOR MANUFACTURING THE SAME, CARRIER FOR ELECTROPHOTOGRAPHIC DEVELOPER AND ELECTROPHOTOGRAPHIC DEVELOPER

(71) Applicants: DOWA ELECTRONICS MATERIALS CO., LTD., Tokyo (JP); DOWA IP CREATION CO., LTD., Okayama, Okayama (JP)

(72) Inventors: Takeshi Kawauchi, Okayama (JP); Sho Ogawa, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 0 days.

(21) Appl. No.: 14/496,263

(22) Filed: Sep. 25, 2014

(65) Prior Publication Data
US 2015/0010462 A1    Jan. 8, 2015

Related U.S. Application Data

(62) Division of application No. 13/579,690, filed as application No. PCT/JP2011/055402 on Mar. 8, 2011.

(30) Foreign Application Priority Data
Mar. 29, 2010 (JP) ................. 2010-074840

(51) Int. Cl.
G03G 9/10   (2006.01)
G03G 9/107  (2006.01)
G03G 9/113  (2006.01)
C01G 49/00  (2006.01)

(52) U.S. Cl.
CPC .......... *G03G 9/1075* (2013.01); *C01G 49/0072* (2013.01); *G03G 9/107* (2013.01); *G03G 9/113* (2013.01); *C01P 2006/40* (2013.01); *C01P 2006/42* (2013.01); *C01P 2006/90* (2013.01)

(58) Field of Classification Search
CPC ....................................................... G03G 9/16
See application file for complete search history.

(56) References Cited

U.S. PATENT DOCUMENTS

| | | | |
|---|---|---|---|
| 2003/0054279 | A1 | 3/2003 | Yamaguchi et al. |
| 2005/0003292 | A1 | 1/2005 | Yamashita et al. |
| 2005/0064315 | A1 | 3/2005 | Yamaguchi et al. |
| 2007/0082286 | A1 | 4/2007 | Yamashita et al. |
| 2007/0141502 | A1 | 6/2007 | Aga et al. |

(Continued)

FOREIGN PATENT DOCUMENTS

| | | |
|---|---|---|
| CN | 101805025 | 8/2010 |
| EP | 1 845 419 | 10/2007 |
| JP | 2003-207950 | 7/2003 |

(Continued)

*Primary Examiner* — Hoa V Le
(74) *Attorney, Agent, or Firm* — Clark & Brody

(57) ABSTRACT

A carrier core particle for an electrophotographic developer includes a composition expressed by a general formula: $Mn_xFe_{3-x}O_{4+y}$ (0<x≤1, 0<y), a full width at half maximum z of the most intense peak (311) plane in a powder X-ray diffraction pattern satisfying 0.16 (degree)≤z, and a magnetization of 50 emu/g or higher in an external magnetic field of 1000 Oe.

3 Claims, 6 Drawing Sheets

(56) References Cited

U.S. PATENT DOCUMENTS

2009/0246677 A1* 10/2009 Tabira .................. G03G 9/10
                                              430/111.33
2010/0086869 A1    4/2010 Yamada et al.

FOREIGN PATENT DOCUMENTS

| JP | 2008-241742 | 10/2008 |
| JP | 2009-086339 | 4/2009 |
| JP | 2009-244792 | 10/2009 |

* cited by examiner

CARRIER CORE PARTICLE FOR ELECTROPHOTOGRAPHIC DEVELOPER, METHOD FOR MANUFACTURING THE SAME, CARRIER FOR ELECTROPHOTOGRAPHIC DEVELOPER AND ELECTROPHOTOGRAPHIC DEVELOPER

TECHNICAL FIELD

This invention relates to a carrier core particle for an electrophotographic developer (hereinafter, sometimes simply referred to as "carrier core particle"), a method for manufacturing the carrier core particle, a carrier for an electrophotographic developer (hereinafter, sometimes simply referred to as "carrier"), and an electrophotographic developer (hereinafter, sometimes simply referred to as "developer"). More particularly, this invention relates to a carrier core particle contained in an electrophotographic developer used in copying machines, MFPs (Multifunctional Printers) or the other types of electrophotographic apparatuses, a method for manufacturing the carrier core particle, a carrier contained in an electrophotographic developer, and an electrophotographic developer.

BACKGROUND ART

Electrophotographic dry developing systems employed in a copying machine, MFP or the other types of electrophotographic apparatuses are categorized into a system using a one-component developer containing only toner and a system using a two-component developer containing toner and carrier. In either of these developing systems, toner charged to a predetermined level is applied to a photoreceptor. An electrostatic latent image formed on the photoreceptor is rendered visual with the toner and is transferred to a sheet of paper. The image visualized by the toner is fixed on the paper to obtain a desired image.

A brief description about development with the two-component developer will be given. A predetermined amount of toner and a predetermined amount of carrier are accommodated in a developing apparatus. The developing apparatus is provided with a plurality of rotatable magnet rollers, which are arranged circumferentially to present alternative south and north poles, and an agitation roller for agitating and mixing the toner and carrier in the developing apparatus. The carrier made of a magnetic powder is carried by the magnet rollers. The magnetic force of the magnet rollers forms a straight-chain like magnetic brush of carrier particles. Agitation produces triboelectric charges that bond a plurality of toner particles to the surface of the carrier particles. The magnetic brush abuts against the photoreceptor with rotation of the magnet rollers and supplies the toner to the surface of the photoreceptor. Development with the two-component developer is carried out as described above.

Fixation of the toner on a sheet of paper results in successive consumption of toner in the developing apparatus, and new toner in the same amount as that of the consumed toner is supplied, whenever needed, from a toner hopper attached to the developing apparatus. On the other hand, the carrier is not consumed for development and used as it is until the carrier comes to the end of its life. The carrier, which is a component of the two-component developer, is required to have various functions including: a function of triboelectrically charging the toner by agitation in an effective manner; an insulating function; and a toner transferring ability to appropriately transfer the toner to the photoreceptor. To improve the toner charging performance, for example, the carrier is required to have appropriate electric resistance (hereinafter, sometimes simply referred to as "resistance") and appropriate insulating properties.

The aforementioned carrier currently made is composed of a carrier core particle, which is a core or a base of the carrier, and a coating resin, which covers the surface of the carrier core particle. Among the disclosed various techniques relating to the carrier core particle, Japanese Unexamined Patent Application Publication No. 2008-241742 (PL1) discloses a technique to prevent the carrier from scattering.

CITATION LIST

Patent Literature

PL1: JP-A No. 2008-241742

SUMMARY OF INVENTION

Technical Problem

The carrier core particle is desired to have good electric properties and appropriate resistance as basic characteristics. The good electric properties imply, for example, that the carrier core particle can hold a large amount of charge and has a high dielectric breakdown voltage.

The carrier core particle is also desired to have good magnetic properties. As described above, the carrier is carried on the magnet rollers in the developing apparatus by magnetic force. If the magnetism of the carrier core particle is low, the retention of the carrier to the magnet rollers becomes low, which may cause scattering of the carrier.

In general, copying machines are installed and used in offices of companies; however, there are various office environments around the world. For instance, some copying machines are used under high-temperature environments at approximately 30° C., while some copying machines are used under high-humidity environments at approximately 90% RH.

Even under the conditions with different temperatures and relative humidities, the developer in a developing apparatus of a copying machine is required to reduce the changes in the properties. The carrier core particle which make up carrier particle, is also desired to reduce its property changes in various environments, in other words, to be less dependent on environments. This is because, for example, the carrier coated with resin may sometimes loose small pieces of the coating resin during agitation in the developing apparatus and the parts of carrier core particle at which the coating resin is peeled off directly demonstrate the properties of the carrier core particle. Therefore, the carrier core particle is desired to be less affected by the environmental conditions.

However, the conventional carrier core particle as represented by LP1 is sometimes affected by environmental conditions. For example, the aforementioned resistance values of some carrier core particles are greatly reduced in a relatively high relative-humidity environment. Such carrier core particles tend to be greatly affected by environmental variations and therefore may deteriorate the image quality.

The object of the present invention is to provide a carrier core particle for an electrophotographic developer, which has good electric properties and magnetic properties and low environmental dependency.

Another object of the present invention is to provide a method for manufacturing a carrier core particle for an electrophotographic developer, which has good electric properties and magnetic properties and low environmental dependency.

Yet another object of the present invention is to provide a carrier for an electrophotographic developer, which has good electric properties and magnetic properties and low environmental dependency.

Yet another object of the present invention is to provide an electrophotographic developer capable of forming good quality images under various environments.

Solution to Problem

The inventors of the present invention conceived to use manganese and iron as main ingredients of a carrier core particle with good electric properties and magnetic properties and low environmental dependency. The inventors also conceived to increase the internal resistance of the carrier core particle, rather than increasing the surface resistance by oxidizing the particle surface through conventional techniques, in order to prevent charge leakage in high relative-humidity environments and to reduce resistance degradation in the high relative-humidity environments. Through keen examinations, the inventors confirmed that the internal resistance of the carrier core particle can be enhanced by controllably adding an excess amount of oxygen in ferrite. The inventors also confirmed that the carrier core particle containing too much oxygen in the ferrite cannot maintain its crystal structure and forms a decomposition product, or hematite, that deteriorates the magnetic properties, and it is therefore essential to control the amount of oxygen so that the carrier core particle contains an excess amount of oxygen in ferrite while maintaining the magnetic properties.

Specifically, the carrier core particle for an electrophotographic developer according to the invention has a composition expressed by a general formula: $Mn_xFe_{3-x}O_{4+y}$ ($0<x\le1$, $0<y$), a full width at half maximum z of the most intense peak (311) plane in a powder X-ray diffraction (hereinafter, sometimes simply referred to as XRD) pattern satisfying 0.16 (degree) $\le z$, and a magnetization of 50 emu/g or higher when an external magnetic field is 1000 Oe.

The carrier core particle controlled so that the carrier core particle excessively contain oxygen therein is expressed by a general formula: $Mn_xFe_{3-x}O_{4+y}$ ($0<x\le1$, $0<y$). Unlike conventional carrier core particle including manganese and iron and having a composition expressed by a general formula: $Mn_xFe_{3-x}O_4$ ($0<x\le1$), the carrier core particle according to the invention excessively contains oxygen in spinel structure, and therefore the full width at half maximum z of the most intense peak (311) plane in the XRD pattern is relatively wider, or 0.16 (degree) or more. For the purpose of preventing degradation of the magnetic properties of the carrier core particle, the magnetization when the external magnetic field is 1000 Oe is 50 emu/g or more. Such a carrier core particle has good electric properties and magnetic properties and low environmental dependency.

A method for calculating an oxygen amount y will be described. Before calculating the oxygen amount y, Mn is assumed to be divalent in the present invention. First, the average valence of Fe is calculated. The average valence of Fe is obtained by quantifying $Fe^{2+}$ and total Fe through oxidation-reduction titration and then calculating the average valence of Fe from the resultant quantities of $Fe^{2+}$ and $Fe^{3+}$. The quantification of $Fe^{2+}$ and total Fe will be described in detail.

(1) Quantification of $Fe^{2+}$

First, ferrite containing iron elements is dissolved in a hydrochloric acid (HCl) solution, which is reducible acid, with carbon dioxide bubbling. Secondly, the amount of $Fe^{2+}$ ion in the solution is quantitatively analyzed through potential difference titration with potassium permanganate solution, thereby obtaining the titer of $Fe^{2+}$.

(2) Quantification of Total Fe

Iron-element containing ferrite, which weighs the same amount as the ferrite used to quantify $Fe^{2+}$, is dissolved in mixed acid solution of hydrochloric acid and nitric acid. This solution is evaporated to dryness, and then a sulfuric acid solution is added to the solution for redissolution to volatilize excess hydrochloric acid and nitric acid. Solid Al is added to the remaining solution to reduce the $Fe^{3+}$ in the solution to $Fe^{2+}$. Subsequently, the solution is measured by the same analysis method used to quantify $Fe^{2+}$ to obtain the titer of the total Fe.

(3) Calculation of Average Valence of Fe

The description (1) provides the determinate quantity of $Fe^{2+}$, and therefore ((2)titer−(1)titer) represents the quantity of $Fe^{3+}$. The following formula determines the average valence number of Fe.

The average valence of Fe={3×((2)titer−(1)titer)+2× (1)titer}/(2)titer

In addition to the aforementioned method, some different oxidation reduction titration methods are applicable to quantify the valence of the iron element; however, the aforementioned method is regarded as superior to others because the reaction required for analysis is simple, the results can be read easily, a general reagent and analysis device can achieve sufficient accuracy, and skilled analyzers are not needed.

Based on the electroneutrality principle, the relationship, Mn valence (valence of +2)×x+average valence of Fe×(3−x)=oxygen valence (valence of −2)×(4+y), is established in a structural formula. From the above formula, the value y is determined.

More preferably, the value y satisfies the following relationship: $y\le-0.41x+0.41$ (where $0<x\le1$ and $0<y$). Such a carrier core particle is more stable and has good electric properties and magnetic properties and low environmental dependency.

The inventors decided to use manganese and iron as main ingredients of a carrier core particle having good electric properties and magnetic properties and low environmental dependency. Then, the inventors focused on a firing step in the manufacturing steps of the carrier core particle. Specifically, the inventors believed that it was essential to control the amount of oxygen so that the carrier core particle contained an excess amount of oxygen in ferrite in order to enhance the inner resistance of the carrier core particle, and conceived that controllably adding an excess amount of oxygen in ferrite of the carrier core particle while maintaining the electric properties and magnetic properties can be done during the firing step where the composition of the internal layer of the carrier core particle is produced.

Another aspect of the present invention directs to a method for manufacturing a carrier core particle for an electrophotographic developer. The carrier core particle contains manganese, iron and oxygen as core composition. The method includes the steps of: granulating a mixture of a raw material containing manganese and a raw material containing iron; raising temperature of the powdery material granulated in the granulation step to a predetermined firing temperature; performing reaction sintering on the powdery material, after the temperature-rising step, by maintaining the powdery material at a predetermined sintering temperature for a predetermined period of time; and cooling the powdery material, after the reaction sintering step, under an atmosphere with an oxygen concentration from 0.3% to 3.0%.

The carrier core particle obtained through the manufacturing method has good electric properties and magnetic properties because it contains manganese and iron in the composition and ferritization, which is a reduction reaction, is fully accelerated by the temperature-rising step. In addition, the cooling step performed under an atmosphere with a relatively high oxygen concentration allows the ferrite to contain an excess amount of oxygen to enhance the internal resistance of the carrier core particle. Even in a high relative-humidity environment, for example, the carrier core particle with which an excess amount of oxygen is controllably added in the ferrite in the inner layer can prevent charge leakage and reduce resistance degradation caused by moisture. It can be said, therefore, that the carrier core particle has good electric properties and magnetic properties and low environmental dependency.

In the manufacturing method of the present invention, after the granulation step, the carrier core particle is raised in temperature in the firing step to accelerate ferritization by reduction reaction, reaction sintering occurs in the carrier core particle at a sintering temperature, and the carrier core particle is cooled from the sintering temperature in an atmosphere with a relatively high oxygen concentration. This method allows the carrier core particle to controllably contain an excess amount of oxygen in ferrite and makes the insulating properties of the internal layer of the carrier core particle good to reduce the environmental dependency while maintaining the electric properties and magnetic properties.

Preferably, the reaction sintering step is performed under the same atmosphere as that in the cooling step. This can more reliably provide a desired carrier core particle.

A more preferable embodiment includes, after the firing step, an oxidation step in which the fired powdery material is oxidized. The oxidation step deposits hematite with high insulating properties on the outermost layer of the carrier core particle, thereby achieving a carrier core particle that does not produce dielectric breakdown even with high voltage application.

Yet another aspect of the present invention directs to a carrier core particle for an electrophotographic developer, the carrier core particle containing manganese, iron and oxygen as core composition, wherein the carrier core particle is manufactured by granulating a mixture of a raw material containing manganese and a raw material containing iron, raising temperature of the granulated powdery material to a predetermined firing temperature, performing reaction sintering on the powdery material by maintaining the powdery material at a predetermined sintering temperature for a predetermined period of time, and cooling the powdery material under an atmosphere with an oxygen concentration from 0.3% to 3.0%.

Yet another aspect of the present invention directs to a carrier for an electrophotographic developer including: a carrier core particle having a composition expressed by a general formula: $Mn_xFe_{3-x}O_{4+y}$ ($0<x\leq1$, $0<y$), a full width at half maximum z of the most intense peak (311) plane in a powder X-ray diffraction pattern satisfying 0.16 (degree)$\leq z$, and a magnetization of 50 emu/g or higher in an external magnetic field of 1000 Oe; and a resin that coats the surface of the carrier core particle.

Such a carrier for an electrophotographic developer has good electric properties and magnetic properties and low environmental dependency.

Yet another aspect of the present invention directs to an electrophotographic developer used to develop electrophotographic images, including: a carrier including a carrier core particle having a composition expressed by a general formula: $Mn_xFe_{3-x}O_{4+y}$ ($0<x\leq1$, $0<y$), a full width at half maximum z of the most intense peak (311) plane in a powder X-ray diffraction pattern satisfying 0.16 (degree)$\leq z$, and a magnetization of 50 emu/g or higher in an external magnetic field of 1000 Oe, and a resin that coats the surface of the carrier core particle; and a toner that can be triboelectrically charged by frictional contact with the carrier for development of electrophotographic images.

Such an electrophotographic developer can form images with excellent quality in various environments.

Advantageous Effects of Invention

The carrier core particle for an electrophotographic developer according to the invention has good electric properties and magnetic properties and low environmental dependency.

The method for manufacturing the carrier core particle for the electrophotographic developer according to the invention can provide a carrier core particle containing an excess amount of oxygen in ferrite in the internal layer thereof. Such a carrier core particle improves the insulating properties and is less affected by the environmental conditions.

The carrier for the electrophotographic developer according to the invention has good electric properties and magnetic properties and low environmental dependency.

With the electrophotographic developer according to the invention, good quality images can be formed under various environments.

DESCRIPTION OF EMBODIMENTS

Figure 1:
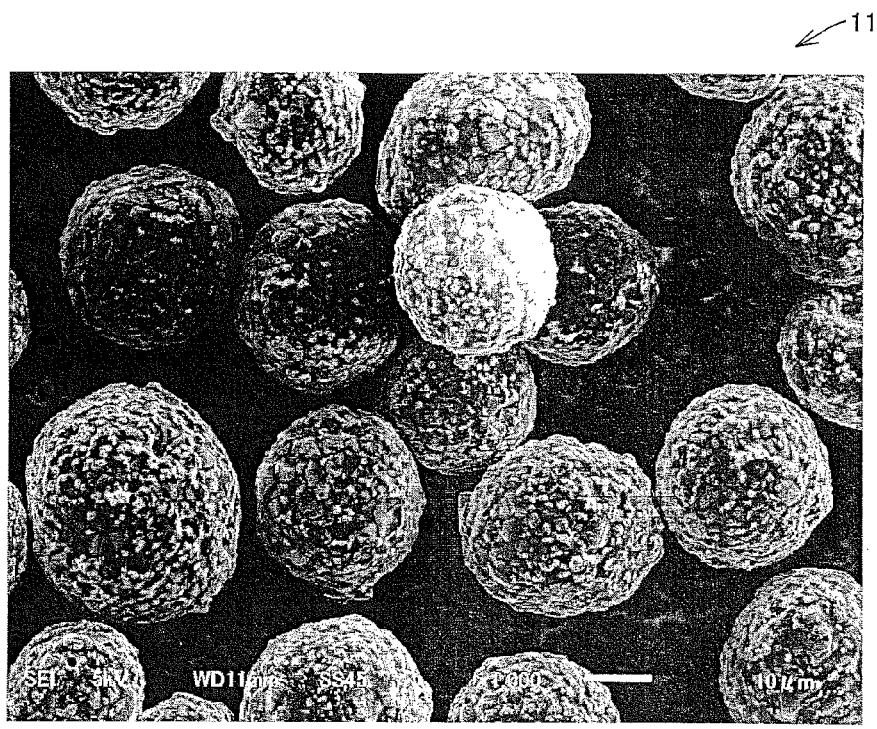
FIG. 1 is an electron micrograph showing the external appearance of a carrier core particle according to an embodiment of the invention.

With reference to the drawings, an embodiment of the present invention will be described. First, a carrier core particle according to the embodiment of the invention will be described. FIG. 1 is an electron micrograph showing the external appearance of a carrier core particle according to the embodiment of the invention.

Referring to FIG. 1, a carrier core particle 11 according to the embodiment of the invention are roughly spherical in shape, approximately 35 μm in diameter and have proper particle size distribution. The diameter of the carrier core particle implies a volume mean diameter. The diameter and particle size distribution are set to any values to satisfy the required developer characteristics, yields of manufacturing steps and some other factors. On the surface of the carrier core particle 11, there are fine asperities formed in a firing step which will be described later.

Figure 2:
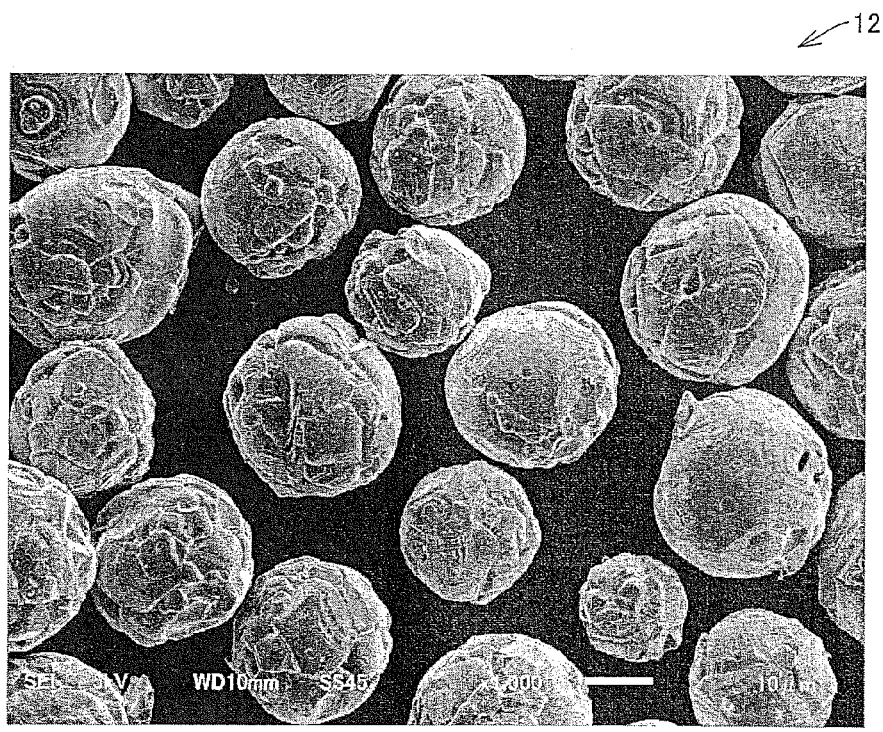
FIG. 2 is an electron micrograph showing the external appearance of a carrier according to the embodiment of the invention.

FIG. 2 is an electron micrograph showing the external appearance of a carrier according to the embodiment of the invention. Referring to FIG. 2, the carrier 12 of the embodiment of the invention is roughly spherical in shape as with the carrier core particle 11. The carrier 12 is made by coating, or covering, the carrier core particle 11 with a thin resin film and has almost the same diameter as the carrier core particle 11. The surface of the carrier 12 is almost completely covered with resin, which is different from the carrier core particle 11.

Figure 3:
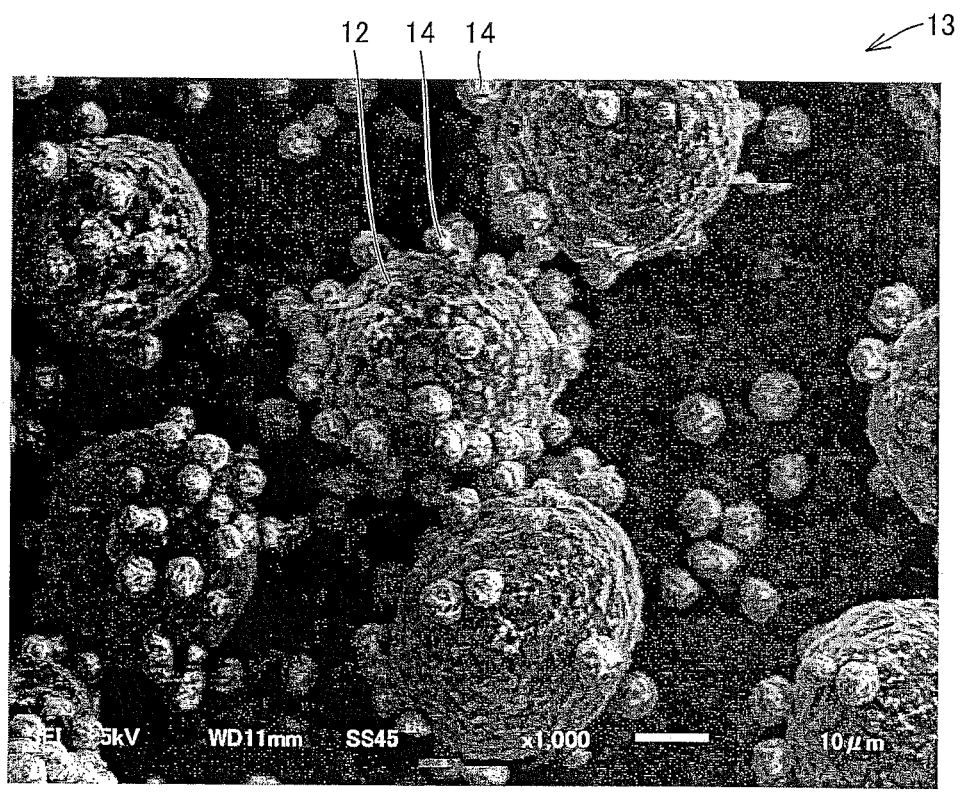
FIG. 3 is an electron micrograph showing the external appearance of the developer according to the embodiment of the invention.

FIG. 3 is an external view schematically showing a developer according to the embodiment of the invention. Referring to FIG. 3, the developer 13 includes the carrier 12 shown in FIG. 2 and toner 14. The toner 14 is also roughly spherical in shape. The toner 14 contains mainly styrene acrylic-based resin or polyester-based resin and a predetermined amount of pigment, wax and other ingredients combined therewith. Such toner 14 is manufactured by, for example, a pulverizing method or polymerizing method. The toner 14 in use is, for example, approximately 5 μm in diameter, which is about one-seventh of the diameter of the carrier 12. The compounding ratio of the toner 14 and carrier 12 is also set to any value according to the required developer characteristics. Such a developer 13 is manufactured by mixing a predetermined amount of the carrier 12 and toner 14 by a suitable mixer.

Figure 4:
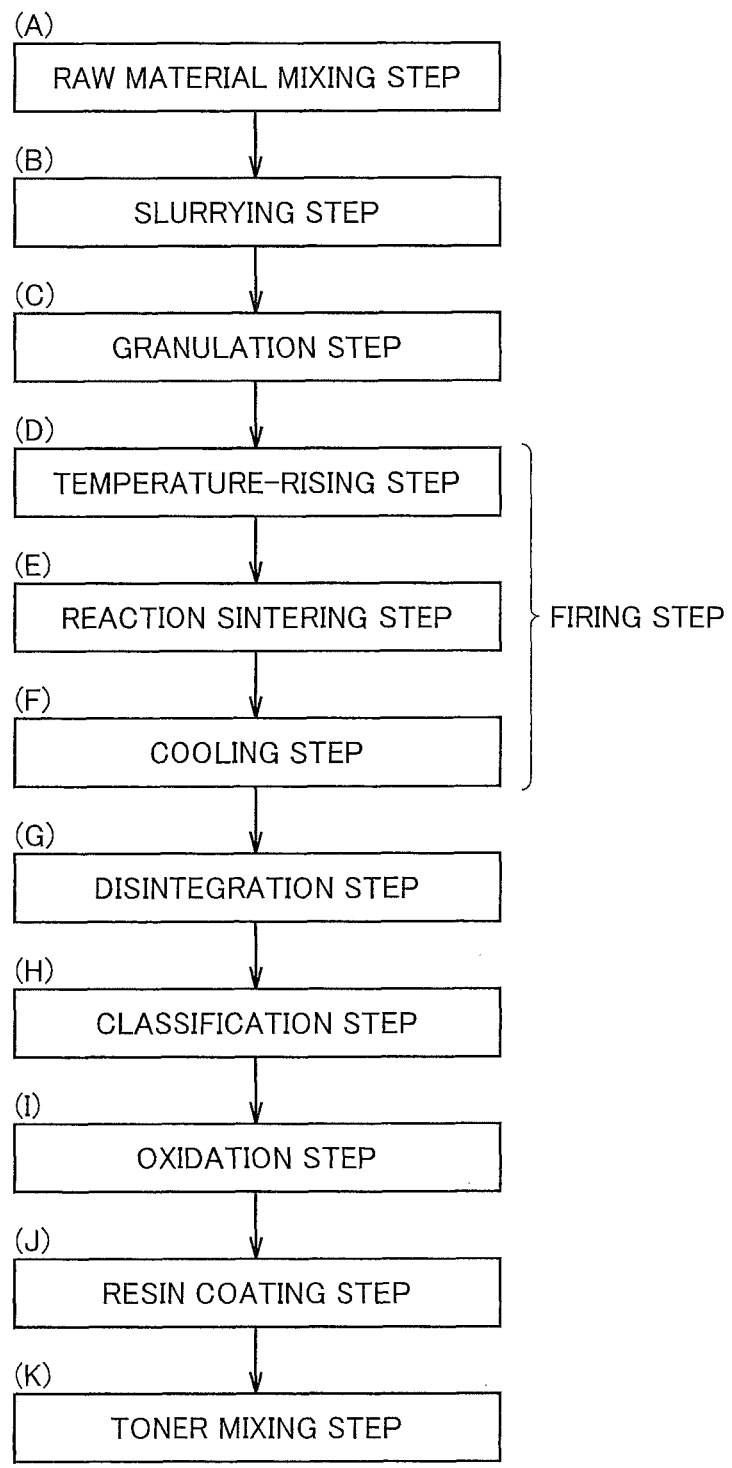
FIG. 4 is a flow chart showing the main steps of a method for manufacturing the carrier core particle according to the embodiment of the invention.

A method for manufacturing the carrier core particle according to the embodiment of the invention will be described. FIG. 4 shows a flow chart of the main steps in the method for manufacturing the carrier core particle according to the embodiment of the invention. Along FIG. 4, the method for manufacturing the carrier core particle of the invention will be described below.

First, a raw material containing manganese and a raw material containing iron are prepared. The raw materials being used can be calcined. The prepared raw materials are formulated at an appropriate compounding ratio to meet the required characteristics, and mixed (FIG. 4(A)).

The iron raw material making up the carrier core particle according to the invention can be metallic iron or an oxide thereof, and more specifically, preferred materials include $Fe_2O_3$, $Fe_3O_4$, Fe, which can stably exist at room temperature and atmospheric pressure. The manganese raw material can be manganese metal or an oxide thereof, and more specifically, preferred materials include Mn metal, $MnO_2$, $Mn_2O_3$, $Mn_3O_4$, and $MnCO_3$, which can stably exist at room temperature and atmospheric pressure.

Next, the mixed raw materials are slurried (FIG. 4(B)). In other words, these raw materials are weighed to make a target composition of the carrier core particle and mixed together to make a slurry raw material.

In the method for manufacturing the carrier core particle according to the invention, a reducing agent may be added to the slurry raw material at a part of a firing step, which will be described later, to accelerate reduction reaction. A preferred reducing agent may be carbon powder, polycarboxylic acid-based organic substance, polyacrylic acid-based organic substance, maleic acid, acetic acid, polyvinyl alcohol (PVA)-based organic substance, or mixtures thereof.

Water is added to the slurry raw material that is then mixed and agitated so as to contain 40 wt % of solids or more, preferably 50 wt % or more. The slurry raw material containing 50 wt % of solids or more is preferable because such a material can maintain the strength of granulated pellets.

Subsequently, the slurried raw material is granulated (FIG. 4(C)). Granulation of the slurry obtained by mixing and agitation is performed with a spray drier. Note that it is preferable to subject the slurry to dry pulverization before the granulation step.

The temperature of an atmosphere during spray drying can be set to approximately 100° C. to 300° C. This can provide granulated powder whose particles are approximately 10 to 200 μm in diameter. In consideration of the final diameter of the particles as a product, it is preferable to filter the obtained granulated powder by a vibrating sieve or the like to remove coarse particles and fine powder for particle size adjustment at this point of time.

Figure 5:
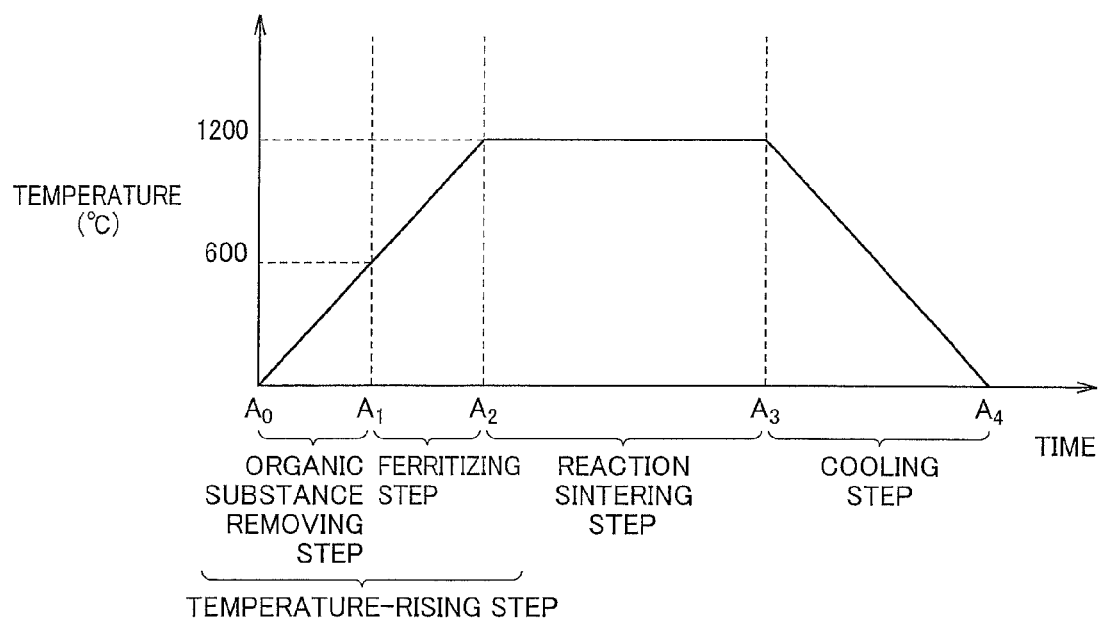
FIG. 5 is a graph schematically showing the relationship between temperature and time in a firing step.
Figure 6:
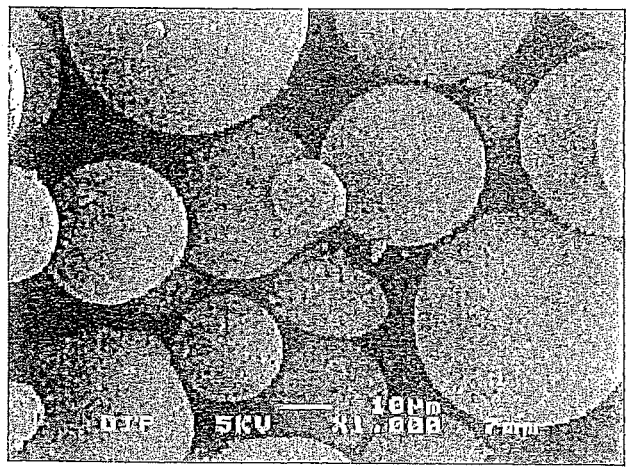
FIG. 6 is an electron micrograph showing the external appearance of the carrier core particle, according to the embodiment of the invention, after a ferritizing step.
Figure 7:
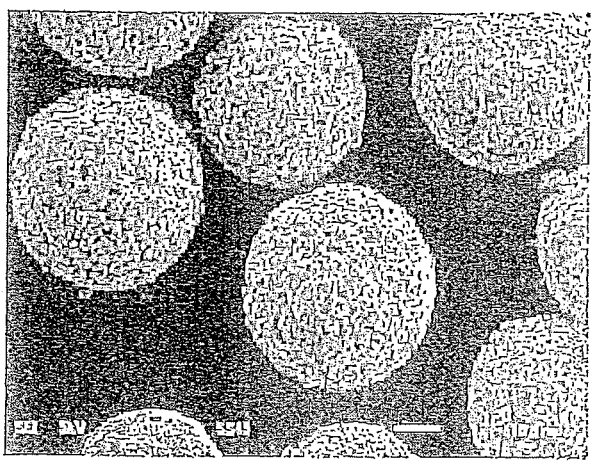
FIG. 7 is an electron micrograph showing the carrier core particle, according to the embodiment of the invention, after a reaction sintering step.

The granulated material is then fired. This firing step is broadly divided into a temperature-rising step (FIG. 4(D)), a sintering step (FIG. 4(E)), and a cooling step (FIG. 4(F)). FIG. 5 is a graph schematically showing the relationship between temperature and time in the firing step. Referring to FIG. 4 together with FIG. 5, respective steps in the firing step will be described.

First, the granulated material is raised in temperature (FIG. 4(D)). For example, temperature is raised in the following manner: the granulated material in a predetermined amount is put in a ceramic container; the granulated material in the container is placed in a furnace; and the furnace is raised in temperature from time $A_0$ to time $A_2$. The temperature rises from the room temperature level to sintering temperatures, for example, approximately 1200° C. at appropriate speed according to the amount of the granulated material and some other factors. In the temperature range up to approximately 600° C. defined by time $A_0$ and time $A_1$, the organic substance in the granulated material evaporates. The time period in which temperature rises to approximately 600° C. is referred to as an organic-substance removal step where the organic substance is removed by evaporation. Subsequently, the granulated material is further raised in temperature to approximately 1200° C. In this temperature range, reduction reaction is accelerated, in other words, ferritization is advanced. The time period in which temperature rises from approximately 600° C. to 1200° C. defined by time $A_1$ and time $A_2$ is referred to as a ferritizing step for accelerating the magnetization of the carrier core particle.

Once the temperature has reached approximately 1200° C., the temperature is maintained for a predetermined period of time, in this embodiment, from time $A_2$ to time $A_3$. While the temperature is maintained for the predetermined period, the reaction sintering is advanced in the ferritized granulated material. Namely, this process is referred to as a sintering step (FIG. 4(E)). The predetermined period of time is set to any length of time according to the amount and diameter of the granulated material.

After completion of the reaction sintering upon lapse of the predetermined period of time, the granulated material is cooled to lower the temperature to nearly room temperature from time $A_3$ to time $A_4$ (FIG. 4(F)). The granulated material can be self-cooled, in other words, the granulated material is cooled by stopping heating to lower the temperature to room temperature level. Alternatively, the granulated material is cooled in steps in a cooler atmosphere.

The cooling step is executed in an atmosphere with an oxygen concentration of 0.3% to 3.0%. More specifically, gas with an oxygen concentration of 0.3% to 3.0% is introduced into the furnace and continues flowing during the cooling step.

This allows the internal layer of the carrier core particle to contain ferrite with an excess amount of oxygen. In the cooling step, if the oxygen concentration of the gas is lower than 0.3%, the amount of oxygen in the internal layer becomes relatively low. On the other hand, if the oxygen concentration is higher than 3.0%, the magnetization of the carrier core particle during formation of the internal layer is lowered, resulting in deterioration of magnetic properties of the carrier core particle. Therefore, cooling should be performed within the range of the aforementioned oxygen concentration.

It is preferable at this stage to control the size of particles of the fired material cooled to room temperature level. The fired material is coarsely ground by a hammer mill or the like. In other words, the fired granulated material is disintegrated (FIG. 4(G)). After disintegration, classification is carried out with a vibrating sieve or the like. In other words, the disintegrated granules are classified (FIG. 4(H)) to obtain carrier core particles with a predetermined diameter.

Then, the classified granulated material undergoes oxidation (FIG. 4(I)). The surface of the carrier core particle obtained in this stage is heat-treated (oxidation) to increase the breakdown voltage to 250 V or higher, thereby imparting an appropriate electric resistance value, from $1 \times 10^6$ to $1 \times 10^{13}$ Ω·cm, to the carrier core particle. Increasing the electric resistance value of the carrier core particles through oxidation can prevent the carrier from scattering caused by charge leakage.

More specifically, the granulated material is placed in an atmosphere with an oxygen concentration of 10% to 100%, at a temperature of 200° C. to 700° C., for 0.1 to 24 hours to obtain the target carrier core particle. More preferably, the granulated material is placed at a temperature of 250° C. to 600° C. for 0.5 to 20 hours, further more preferably, at a temperature of 300° C. to 550° C. for 1 to 12 hours.

In this manner, the carrier core particle according to the embodiment of the invention is manufactured. The method for manufacturing the carrier core particle for an electrophotographic developer according to the invention includes a granulation step of granulating a mixture of a raw material including manganese and a raw material including iron, a temperature-rising step of raising the temperature of the powdery material granulated in the granulation step to a predetermined temperature capable of sintering, a reaction sintering step of, after the temperature-rising step, maintaining the powdery material at a predetermined sintering temperature for a predetermined period of time to cause reaction sintering in the powdery material, and a cooling step of, after the reaction sintering step, cooling the powdery material under an atmosphere with an oxygen concentration of 0.3% to 3.0%.

The carrier core particle thus obtained is coated with resin (FIG. 4(J)). Specifically, the carrier core particle obtained according to the invention is coated with silicone-based resin, acrylic resin, or the like. This coating can impart electrification and improve durability, thereby providing a carrier for an electrophotographic developer. The coating with silicone-based resin, acrylic resin or the like can be done by well-known techniques. The carrier for the electrophotographic developer according to the invention includes a carrier core particle having a composition expressed by a general formula: $Mn_xFe_{3-x}O_{4+y}$ ($0<x\leq1$, $0<y$), a full width at half maximum z of the most intense peak (311) plane in a powder X-ray diffraction pattern satisfying 0.16 (degree)≤z, and a magnetization of 50 emu/g or higher in an external magnetic field of 1000 Oe, and a resin that coats the surface of the carrier core particle for the electrophotographic developer. The magnetization will be described later.

Next, the carrier and toner thus obtained are mixed in predetermined amounts (FIG. 4(K)). Specifically, the carrier for the electrophotographic developer according to the invention is mixed with appropriate well-known toner. In this manner, the electrophotographic developer according to the invention can be achieved. The carrier and toner are mixed by any mixer, for example, a ball mill. The electrophotographic developer according to the invention is used to develop electrophotographic images and contains the carrier and toner, the carrier including a carrier core particle that has a composition expressed by a general formula: $Mn_xFe_{3-x}O_{4+y}$ ($0<x\leq1$, $0<y$), a full width at half maximum z on the most intense peak (311) plane in a powder X-ray diffraction pattern satisfying 0.16 (degree) ≤z, and a magnetization of 50 emu/g or higher in an external magnetic field of 1000 Oe, and a resin that coats the surface of the carrier core particle, and the toner that can be triboelectrically charged by frictional contact with the carrier for development of electrophotographic images.

In the above embodiment, the cooling step is performed under an atmosphere with an oxygen concentration of 0.3% to 3.0%; however, the present invention is not limited thereto and the reaction sintering step can be also performed under the same atmosphere as that in the cooling step. After completion of ferritizing reaction, which is reduction reaction, the oxygen concentration in the atmosphere is set to 0.3% to 3.0% from time $A_2$ at which the reaction sintering step starts. Performing the reaction sintering step under such an atmosphere can relatively increase the amount of oxygen in the internal layer of the carrier core particle with reliability, thereby obtaining a desired carrier core particle.

EXAMPLES

Example 1

10 kg of $Fe_2O_3$ (average particle diameter: 0.6 μm) and 4 kg of $Mn_3O_4$ (average particle diameter: 2 μm) were dispersed in 4.5 kg of water, and 83.5 g of ammonium polycarboxylate-based dispersant, 45 g of carbon black reducing agent and 14 g of colloidal silica as $SiO_2$ raw material (solid concentration of 50%) were added to make a mixture. The solid concentration of the mixture was measured and results in 75 wt %. The mixture was pulverized by a wet ball mill (media diameter: 2 mm) to obtain mixture slurry.

The slurry was sprayed into hot air of approximately 130° C. by a spray dryer and turned into dried granulated powder. At this stage, granulated powder particles out of the target particle size distribution were removed by a sieve. This granulated powder was placed in an electric furnace and fired at 1200° C. for three hours. During firing, gas was controlled to flow in the electric furnace such that the atmosphere in the electric furnace was adjusted to have an oxygen concentration of 0.3%. The obtained fired material was disintegrated and then classified by a sieve, thereby obtaining a carrier core particle of Example 1 whose average particle diameter is 25 μm. The physical properties, magnetic properties and electric properties of the carrier core particle will be shown in Table 1.

The resultant carrier core particle was then maintained in an atmosphere at 440° C. for one hour for oxidization to obtain the carrier core particle of Example 1. The physical properties, magnetic properties and electric properties of the carrier core particle will be shown in Table 2.

Example 2

The carrier core particle of Example 2 was obtained in the same manner as in Example 1, but the oxygen concentration in the electric furnace was set to 0.6%. The physical properties, magnetic properties and electric properties of the resultant carrier core particle will be shown in Tables 1 and 2.

Example 3

The carrier core particle of Example 3 was obtained in the same manner as in Example 1, but the oxygen concentration in the electric furnace was set to 1.0%. The physical properties, magnetic properties and electric properties of the resultant carrier core particle will be shown in Tables 1 and 2.

Example 4

The carrier core particle of Example 4 was obtained in the same manner as in Example 1, but the added $Fe_2O_3$ (average particle diameter: 0.6 μm) was 9.4 kg, the added $Mn_3O_4$ (average particle diameter: 2 μm) was 4.6 kg, and carbon black was not added. The physical properties, magnetic properties and electric properties of the resultant carrier core particle will be shown in Tables 1 and 2.

Example 5

The carrier core particle of Example 5 was obtained in the same manner as in Example 4, but the oxygen concentration in the electric furnace was set to 0.6%. The physical properties, magnetic properties and electric properties of the resultant carrier core particle will be shown in Tables 1 and 2.

Example 6

The carrier core particle of Example 6 was obtained in the same manner as in Example 4, but the oxygen concentration in the electric furnace was set to 1.0%. The physical properties, magnetic properties and electric properties of the resultant carrier core particle will be shown in Tables 1 and 2.

Example 7

The carrier core particle of Example 7 was obtained in the same manner as in Example 4, but the oxygen concentration in the electric furnace was set to 3.0%. The physical properties, magnetic properties and electric properties of the resultant carrier core particle will be shown in Tables 1 and 2.

Example 8

The carrier core particle of Example 8 was obtained in the same manner as in Example 2, but the added $Fe_2O_3$ (average particle diameter: 0.6 μm) was 10.8 kg, the added $Mn_3O_4$ (average particle diameter: 2 μm) was 3.2 kg, and the added carbon black was 60 g. The physical properties, magnetic properties and electric properties of the resultant carrier core particle will be shown in Tables 1 and 2.

Example 9

The carrier core particle of Example 9 was obtained in the same manner as in Example 8, but the oxygen concentration in the electric furnace was set to 3.0%. The physical properties, magnetic properties and electric properties of the resultant carrier core particle will be shown in Tables 1 and 2.

Comparative Example 1

The carrier core particle of Comparative Example 1 was obtained in the same manner as in Example 1, but the oxygen concentration in the electric furnace was set to 0.05% and oxidation was performed at 350° C. The physical properties, magnetic properties and electric properties of the resultant carrier core particle will be shown in Tables 1 and 2.

Comparative Example 2

The carrier core particle of Comparative Example 2 was obtained in the same manner as in Example 1, but the oxygen concentration in the electric furnace was set to 0.05%. The physical properties, magnetic properties and electric properties of the resultant carrier core particle will be shown in Tables 1 and 2.

Comparative Example 3

The carrier core particle of Comparative Example 3 was obtained in the same manner as in Example 1, but the oxygen concentration in the electric furnace was set to 6.3%. The physical properties, magnetic properties and electric properties of the resultant carrier core particle will be shown in Tables 1 and 2.

Comparative Example 4

The carrier core particle of Comparative Example 4 was obtained in the same manner as in Example 8, but the oxygen concentration in the electric furnace was set to 0.05%. The physical properties, magnetic properties and electric properties of the resultant carrier core particle will be shown in Tables 1 and 2.

Figure 8:
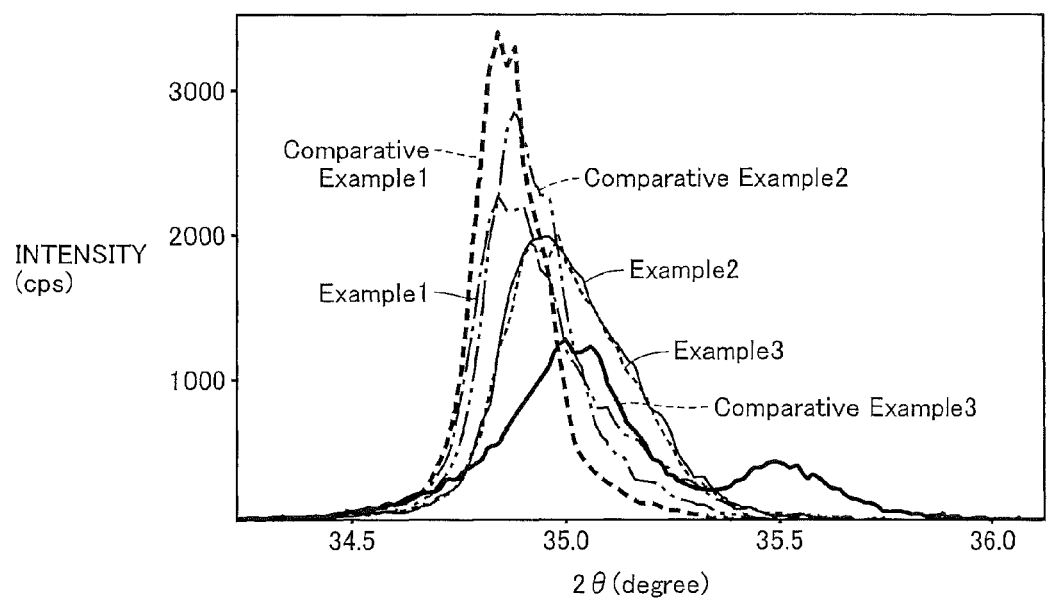
FIG. 8 is an XRD chart of carrier core particles according to the embodiment of the invention and conventional carrier core particles

FIG. 8 shows an XRD chart of Examples 1 to 9 and Comparative Examples 1 to 4. In FIG. 8, the horizontal axis indicates 2θ (degree), while the vertical axis indicates intensity (cps (count per second)). The XRD technique was performed under the following measurement conditions: the X-ray diffractometer in use was Ultima IV produced by Rigaku Corporation; the X-ray source was Cu; the acceleration voltage was 40 kV; the current was 40 mA; the divergence slit angle was 1°; the scattering slit angle was 1°; the receiving slit width was 0.3 mm; the scanning mode was step scanning; the step width was 0.0200°; the coefficient time was 1.0 second; and the number of integration was 1.

Examples and Comparative Examples will be briefly summarized as follows. Example 1 was prepared with x=0.85 and at an oxygen concentration of 0.3% in the cooling step. Example 2 was prepared with x=0.85 and at an oxygen concentration of 0.6% in the cooling step. Example 3 was prepared with x=0.85 and at an oxygen concentration of 1.0% in the cooling step. Example 4 was prepared with x=0.99 and at an oxygen concentration of 0.3% in the cooling step. Example 5 was prepared with x=0.99 and at an oxygen concentration of 0.6% in the cooling step. Example 6 was prepared with x=0.99 and at an oxygen concentration of 1.0% in the cooling step. Example 7 was prepared with x=0.99 and at an oxygen concentration of 3.0% in the cooling step. Example 8 was prepared with x=0.7 and at an oxygen concentration of 0.6% in the cooling step. Example 9 was prepared with x=0.7 and at an oxygen concentration of 3.0% in the cooling step. Comparative Example 1 was prepared with x=0.85, at an oxygen concentration of 0.05% in the cooling step and at a temperature of 350° C. in the oxidation step. Comparative Example 2 was prepared with x=0.85 and at an oxygen concentration of 0.05% in the cooling step. Comparative Example 3 was prepared with x=0.85 and at an oxygen concentration of 6.3% in the cooling step. Comparative Example 4 was prepared with x=0.7 and at an oxygen concentration of 0.05% in the cooling step. The Examples 1 to 9 and Comparative Examples 2 to 4 were oxidized at 440° C.

[Table 1]
[Table 2]

The temperatures listed in oxidation conditions in Table 2 denote temperatures (° C.) in the above-described oxidation step. Tables 1 and 2 show "σ1k" that represents magnetization when the external magnetic field is 1000 Oe. The resistance values in Table 1 are obtained in a medium temperature and medium humidity environment, or more specifically, in an environment at a temperature of 25° C. and a relative humidity of 50%, while the resistance values in Table 2 are obtained in a high temperature and high humidity environment, or more specifically, in an environment at a temperature of 30° C. and a relative humidity of 90%. The resistance values listed in Tables 1 and 2 are represented logarithmically, for example, $1 \times 10^6$ Ω·cm=Log R=6.0. The carrier core particles were applied with voltages shown in Tables 1 and 2 and the resistance values (Ω·cm) upon application of the voltages were measured. B.D. in Tables 1 and 2 indicates that the carrier core particles are in a dielectric breakdown state.

Measurement of the resistance values will be now described. The carrier core particles were placed in environments shown by Tables 1 and 2 while humidity was controlled for one day, and then measured in the environments. First, two SUS (JIS) 304 plates each having a thickness of 2 mm and a surface serving as an electrode made by electrolytic grinding were disposed on a horizontally placed insulating plate, or for example an acrylic plate coated with Teflon (trade mark), so that the electrodes are spaced 1 mm apart. The two electrode plates were placed so that the normal lines to the plates are along the horizontal direction. After 200±1 mg of powder to be measured was charged in a gap between the two electrode plates, magnets having a cross-sectional area of 240 mm$^2$ were disposed behind the respective electrode plates to form a bridge made of the powder being measured between the electrodes. While keeping the state, DC voltages were applied between the electrodes in the increasing order of the voltage values, and the value of current passing through the powder being measured was measured by a two-terminal method to determine electric resistance values. For the measurement, a super megohmmeter, SM-8215 produced by HIOKI E. E. CORPORATION, was used. The electric resistance value is expressed by a formula: electric resistance value (Ω·cm) =measured resistance value (Ω)×cross-sectional area (2.4 cm$^2$)÷interelectrode distance (0.1 cm). As described above, the resistance values listed in Table 2 are represented logarithmically. When the electric resistance value (R) is $1 \times 10^6$ Ω·cm, Log R=6.0 is established. Note that the magnets in use can be anything as long as they can cause the powder to form a bridge. In this embodiment, a permanent magnet, for example, a ferrite magnet, whose surface magnetic flux density is 1000 gauss or higher was used.

Figure 9:
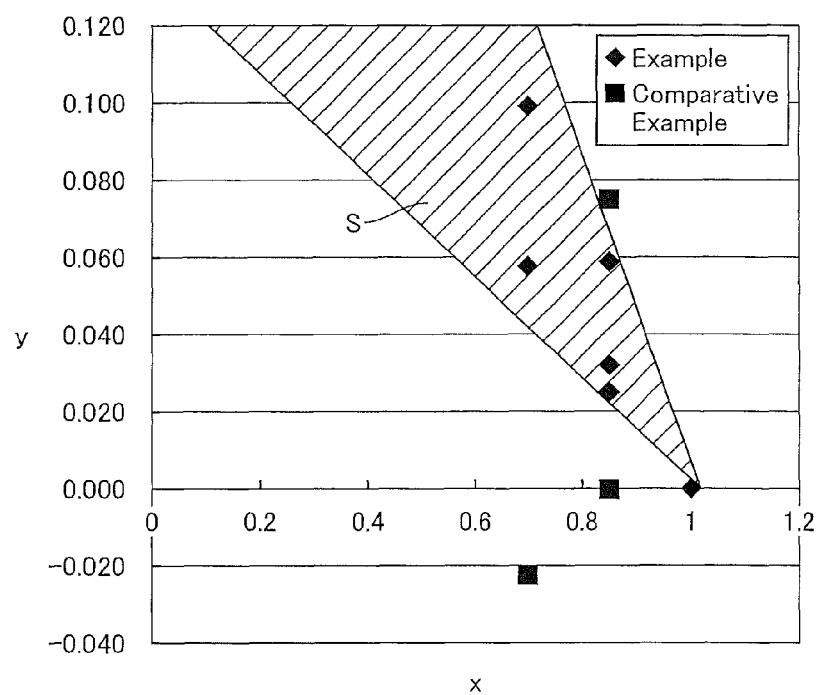
FIG. 9 is a graph showing the relationship between x and y.

Referring to Tables 1 and 2, the carrier core particle of Comparative Example 3 that was cooled at an oxygen concentration of 6.3% (oxygen amount y: 0.075) has a magnetization of 35.6 emu/g, which exhibits the insufficient magnetic properties. On the other hand, any of Examples 1 to 9 has a magnetization of at least 50 emu/g before and after oxidation. Each of Comparative Examples 1 and 2 has an oxygen amount y of 0, and Comparative Example 4 has an oxygen amount y of approximately −0.02, those of which are relatively small amounts of oxygen. On the other hand, Examples 1 to 9 each have an oxygen amount y satisfying at least y≤−0.41x+0.41 (where, 0<x≤1 and 0<y). Accordingly, the carrier core particles containing oxygen in this range have more stable, good electric properties and magnetic properties and low environmental dependency. For reference, the relationship between x and y will be shown in FIG. 9. When the horizontal axis represents x and the vertical axis represents y, the carrier core particles within the range S can more reliably provide the effect of the present invention.

The resistance values of Comparative Examples 1, 2, 4 and Examples 1 to 9 decrease with an increase of applied voltage. The declines in the resistance values of Examples 1 to 9 are more gradual than that of Comparative Examples 1, 2, 4. It can be said that Examples 1 to 9 are superior to Comparative Examples 1, 2, 4, because Examples 1 to 9 maintain high resistance values in medium temperature and medium humidity environments due to their low decreasing rates of the resistance values. Examples 1 to 9 exhibit the same tendencies even in high temperature and high humidity environments. In addition, Examples 1 to 9 have relatively high B.D. voltages in comparison with Comparative Examples 1, 2, 4. In short, Examples 1 to 9 are superior in the properties in both the medium temperature and medium humidity environments and the high temperature and high humidity environments.

The principle of the present invention will be contemplated below. The internal layers of the carrier core particles according to Comparative Examples 1, 2, 4 contain relatively small amounts of oxygen. Such carrier core particles are considered to start charge leakage when exposed to moisture in a relatively large amount present in an environment at high absolute humidity, and therefore the resistance values of the carrier core particles are lowered. On the contrary, the internal layers of the carrier core particles according to Examples 1 to 9 contain relatively large amounts of oxygen. Such carrier core particles are considered not to easily start charge leakage even when exposed to moisture in a relatively large amount present in an environment at high absolute humidity, and the resistance values of the carrier core particles are seldom lowered. As a result, it can be considered that the carrier core particles according to the invention have low environmental dependency. The carrier core particle of Comparative Example 3 has problems in magnetization due to the excessively high oxygen concentration during cooling.

In the above embodiment, oxidation is performed after the classification step, the present invention is not limited thereto, but can omit the oxidation step as needed. If appropriate environmental dependency and other properties are achieved in the firing step, the oxidation step can be omitted.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

Industrial Applicability

The carrier core particle for an electrophotographic developer according to the invention, the method for manufacturing the carrier core particle, the carrier for an electrophotographic developer, and the electrophotographic developer can be effectively used when applied to copying machines or the like in various usage environments.

Reference Signs List

11: carrier core particle, 12: carrier, 13: developer, 14: toner.

TABLE 1

| | Firing conditions | | | Before oxidation | | | | | |
|---|---|---|---|---|---|---|---|---|---|
| | Firing temperature | Oxygen concentration during cooling | $\sigma 1k$ | Resistance ($\Omega \cdot cm$) under MM environment (25° C., 50% RH) | | | | | |
| | °C. | % | emu/g | 500 V/cm | 1000 V/cm | 2500 V/cm | 5000 V/cm | 7500 V/cm | 10000 V/cm |
| Example 1 | 1200 | 0.3 | 70.2 | 7.89 | 7.63 | 6.45 | B.D | B.D | B.D |
| Example 2 | 1200 | 0.6 | 68.5 | 7.92 | 7.66 | 7.39 | 6.75 | B.D | B.D |
| Example 3 | 1200 | 1.0 | 65.4 | 8.20 | 7.99 | 7.32 | 6.39 | B.D | B.D |
| Example 4 | 1200 | 0.3 | 66.4 | 9.02 | 7.78 | B.D | B.D | B.D | B.D |
| Example 5 | 1200 | 0.6 | 65.7 | 8.75 | 7.77 | B.D | B.D | B.D | B.D |
| Example 6 | 1200 | 1.0 | 64.8 | 8.76 | 7.90 | B.D | B.D | B.D | B.D |
| Example 7 | 1200 | 3.0 | 59.7 | 8.92 | B.D | B.D | B.D | B.D | B.D |
| Example 8 | 1200 | 0.6 | 64.5 | 8.78 | 9.01 | B.D | B.D | B.D | B.D |
| Example 9 | 1200 | 3.0 | 58.2 | 8.98 | 8.52 | 7.52 | B.D | B.D | B.D |
| Comparative Examples 1, 2 | 1200 | 0.05 | 66.8 | 6.98 | 5.71 | B.D | B.D | B.D | B.D |
| Comparative Example 3 | 1200 | 6.3 | 35.6 | 8.00 | 7.96 | 7.95 | 7.84 | 6.55 | B.D |
| Comparative Example 4 | 1200 | 0.05 | 69.6 | 8.10 | B.D | B.D | B.D | B.D | B.D |

| | Before oxidation | | | | | |
|---|---|---|---|---|---|---|
| | B.D. voltage V/cm | Average valence of Fe | Lattice constant Å | Structural formula | x | Oxygen amount y |
| Example 1 | 5000 | 2.95 | 8.513 | $Mn_{0.85}Fe_{2.15}O_{4.025}$ | 0.85 | 0.025 |
| Example 2 | 7500 | 2.96 | 8.494 | $Mn_{0.85}Fe_{2.15}O_{4.032}$ | 0.85 | 0.032 |
| Example 3 | 7500 | 2.99 | 8.486 | $Mn_{0.85}Fe_{2.15}O_{4.059}$ | 0.85 | 0.059 |
| Example 4 | 2500 | 3.00 | 8.518 | $Mn_{0.99}Fe_{2.01}O_{4.005}$ | 0.99 | 0.005 |
| Example 5 | 2500 | 3.00 | 8.516 | $Mn_{0.99}Fe_{2.01}O_{4.005}$ | 0.99 | 0.005 |
| Example 6 | 2500 | 3.00 | 8.513 | $Mn_{0.99}Fe_{2.01}O_{4.005}$ | 0.99 | 0.005 |
| Example 7 | 1000 | 3.00 | 8.486 | $Mn_{0.99}Fe_{2.01}O_{4.005}$ | 0.99 | 0.005 |
| Example 8 | 2500 | 2.92 | 8.477 | $Mn_{0.7}Fe_{2.3}O_{4.058}$ | 0.7 | 0.058 |
| Example 9 | 5000 | 2.96 | 8.450 | $Mn_{0.7}Fe_{2.3}O_{4.099}$ | 0.7 | 0.099 |
| Comparative Examples 1, 2 | 2500 | 2.93 | 8.526 | $Mn_{0.85}Fe_{2.15}O_4$ | 0.85 | 0.000 |
| Comparative Example 3 | 10000 | 3.00 | 8.523 | $Mn_{0.85}Fe_{2.15}O_{4.075}$ | 0.85 | 0.075 |
| Comparative Example 4 | 1000 | 2.85 | 8.485 | $Mn_{0.7}Fe_{2.3}O_{3.977}$ | 0.7 | −0.023 |

TABLE 2

| | Oxidation conditions | | | After oxidation | | | | | |
|---|---|---|---|---|---|---|---|---|---|
| | Temperature | Oxygen concentration | $\sigma 1k$ | Resistance ($\Omega \cdot cm$) under HH environment (30° C., 90% RH) | | | | | |
| | °C. | % | emu/g | 500 V/cm | 1000 V/cm | 2500 V/cm | 5000 V/cm | 7500 V/cm | 10000 V/cm |
| Example 1 | 440 | 20.6 | 61.5 | 7.53 | 7.71 | 7.44 | 7.27 | 7.10 | B.D |
| Example 2 | 440 | 20.6 | 61.5 | 7.41 | 7.72 | 7.55 | 7.38 | 7.24 | 7.02 |
| Example 3 | 440 | 20.6 | 62.0 | 7.66 | 7.81 | 7.33 | 7.08 | 6.89 | B.D |
| Example 4 | 440 | 20.6 | 62.3 | 6.37 | 6.58 | 6.49 | 6.08 | B.D | B.D |
| Example 5 | 440 | 20.6 | 58.9 | 6.57 | 6.80 | 6.93 | 6.70 | 6.52 | 6.35 |
| Example 6 | 440 | 20.6 | 58.3 | 6.57 | 6.80 | 6.89 | 6.62 | 6.44 | 6.28 |
| Example 7 | 440 | 20.6 | 58.5 | 7.15 | 7.18 | 6.95 | 6.61 | 6.39 | 6.23 |
| Example 8 | 440 | 20.6 | 62.7 | 7.73 | 7.89 | 7.10 | 6.85 | B.D | B.D |
| Example 9 | 440 | 20.6 | 55.9 | 7.68 | 7.84 | 7.35 | 7.01 | 6.95 | B.D |
| Comparative Example 1 | 350 | 20.6 | 66.5 | 7.21 | 6.43 | B.D | B.D | B.D | B.D |

TABLE 2-continued

| | | | | | | | | | |
|---|---|---|---|---|---|---|---|---|---|
| Comparative Example 2 | 440 | 20.6 | 64.2 | 7.33 | 7.40 | 6.61 | B.D | B.D | B.D |
| Comparative Example 3 | 440 | 20.6 | 33.8 | 7.61 | 7.79 | 7.70 | 7.60 | 7.53 | 7.44 |
| Comparative Example 4 | 440 | 20.6 | 66.7 | 7.74 | 7.83 | 6.97 | B.D | B.D | B.D |

| | After oxidation | | | | | |
|---|---|---|---|---|---|---|
| | B.D. voltage V/cm | Average valence of Fe | Lattice constant Å | Full width at half maximum z of most intense peak degree | Crystalline phase | |
| Example 1 | 10000 | 2.991 | 8.510 | 0.167 | $MnFe_2O_4$ | |
| Example 2 | >10000 | 2.998 | 8.497 | 0.219 | $MnFe_2O_4$ | |
| Example 3 | 10000 | 3.000 | 8.503 | 0.300 | $MnFe_2O_4$ | $Fe_2O_3$ |
| Example 4 | 7500 | 3.000 | 8.511 | 0.269 | $MnFe_2O_4$ | $Fe_2O_3$ |
| Example 5 | >10000 | 3.000 | 8.477 | 0.320 | $MnFe_2O_4$ | |
| Example 6 | >10000 | 3.000 | 8.488 | 0.289 | $MnFe_2O_4$ | |
| Example 7 | >10000 | 3.000 | 8.482 | 0.169 | $MnFe_2O_4$ | $Fe_2O_3$ |
| Example 8 | 7500 | 2.963 | 8.484 | 0.165 | $MnFe_2O_4$ | $Fe_2O_3$ |
| Example 9 | 10000 | 2.982 | 8.493 | 0.182 | $MnFe_2O_4$ | $Fe_2O_3$ |
| Comparative Example 1 | 2500 | 2.958 | 8.512 | 0.122 | $MnFe_2O_4$ | |
| Comparative Example 2 | 5000 | 3.000 | 8.510 | 0.135 | $MnFe_2O_4$ | |
| Comparative Example 3 | >10000 | 3.000 | 8.500 | 0.299 | $MnFe_2O_4$ | $Fe_2O_3$ |
| Comparative Example 4 | 5000 | 2.936 | 8.494 | 0.150 | $MnFe_2O_4$ | $Fe_2O_3$ |

The invention claimed is:

1. A method for manufacturing a carrier core particle for an electrophotographic developer, the carrier core particle containing manganese, iron and oxygen as core composition, the method comprising the steps of:
    granulating a mixture of a raw material containing manganese and a raw material containing iron;
    raising temperature of the powdery material granulated in the granulation step to a predetermined firing temperature;
    performing reaction sintering on the powdery material, after the temperature-rising step, by maintaining the powdery material at a predetermined sintering temperature for a predetermined period of time; and
    cooling the powdery material, after the reaction sintering step, under an atmosphere with an oxygen concentration from 0.6% to 3.0%.

2. The method for manufacturing the carrier core particle for the electrophotographic developer according to claim 1, wherein
    the reaction sintering step is performed under the same atmosphere as in the cooling step.

3. The method for manufacturing the carrier core particle for the electrophotographic developer according to claim 1, further comprising a step of:
    oxidizing the sintered powdery material after the reaction sintering step.

* * * * *